UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

PROPELLER LATHE.

1,425,563.      Specification of Letters Patent.      Patented Aug. 15, 1922.

Application filed August 4, 1919. Serial No. 315,083.

*To all whom it may concern:*

Be it known that I, LELAND B. WHIPPLE, a citizen of the United States, residing at Rochester, in the county of Monroe and State of New York, have invented certain Improvements in Propeller Lathes, of which the following description, in connection with the accompanying drawings, is a specification, like reference characters on the drawings indicating like parts in the several figures.

This invention relates to copying lathes, and is disclosed as embodied in a lathe designed especially for turning articles such as airplane propeller blades. Various objects, of which propeller blades are an example, are very long and slender, and require to be shaped with the utmost accuracy, as a slight error in form may impair or destroy the usefulness of the article; for example, in the case of a propeller blade it may result in very serious accident when the propeller is in actual use.

Owing to the impossibility heretofore experienced of producing these objects in a copying lathe, due to their bending under the pressure of the lathe instrumentalities, they have been produced by hand, which requires a great deal of time and makes the output scanty and expensive. It is the object of the present invention to provide for the mechanical production of such objects with accuracy and speed.

One of the points of prime importance in the making of a propeller is forming the blades in exactly similar relation to the hub. I have found that this can be accomplished and that also the bending difficulty can be obviated by the practice of a novel method which, as set forth herein, preferably comprises initially forming the hub on the blank including, preferably, the formation of features having a useful relation to the function performed by the product, such as all requisite holes and the like, supporting it in the machine by this prepared hub, preferably by devices engaging and fitting in the holes, supporting the blank also at its ends and copy turning the blades simultaneously and preferably in opposite directions from or toward the hub. This method, in its various aspects, in its entirety, and in part, constitutes an important part of the invention.

Considered in another aspect, the invention provides a novel organization of means for engaging a prepared hub on a propeller blank, and rotating it thereby and for supporting the blank also at its ends, and reproducing mechanism, including supporting and rotating means for a model, arranged to reproduce both blades simultaneously.

These and other aspects of the invention will be understood from the following description of a preferred embodiment thereof, selected for purposes of illustration and shown in the drawings in which.

Figures 8, 9, 10:
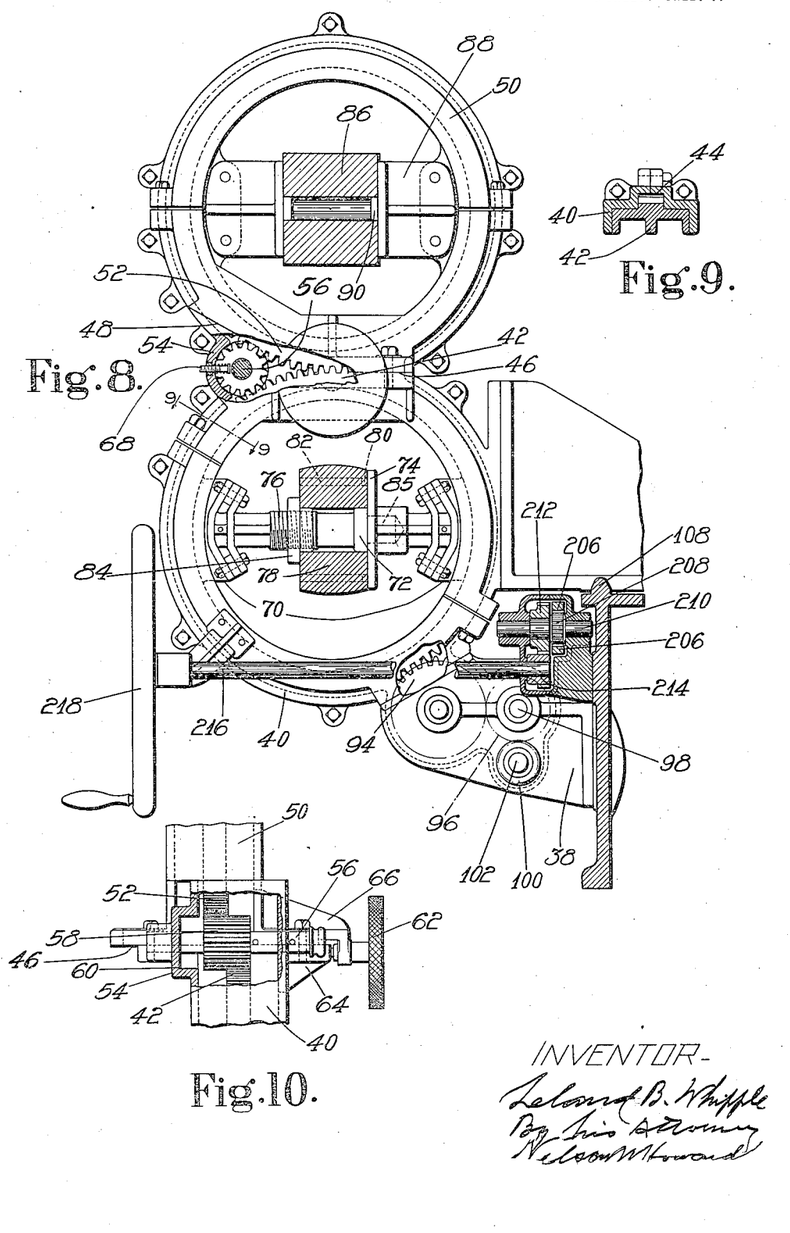
Fig. 8 is a sectional elevation of the model and work driving mechanisms.
Fig. 9 is a cross section upon the line 9—9 of Fig. 8.
Fig. 10 is a detail showing the reversing mechanism.

The base 10 has two forwardly extending brackets 12 and 14 carrying slideways 16, 18, respectively, upon each of which is mounted a double tail stock 20 and 22, respectively. These stocks carry spindles 24 and 26 for the block and model, respectively. The spindles carry dogs 28 and 30, respectively, for engaging the block and model and are tightened upon the work by means of hand wheels 32 and 34 and clamped by clamps 36 in the ordinary manner. At the center of the machine is a bracket 38 extending forwardly and carrying the gear casing 40 in which is fitted a gear wheel 42 the teeth of which rotate in a guiding channel 44 in the gear casing. At the top of the gear casing is a horizontal flat slideway 46 having a forwardly sloping extension 48, upon which is slidably mounted a second gear casing 50 containing a similar gear 52. At the upper front corner of the casing 40 is a small gear casing 54 carrying a spindle 56 upon which is mounted a small pinion 58. The casing 54 has an extension 60 on one side into which the pinion 58 can be slid by operating the spindle 56. When in this position it will not engage the gear 42 and while in the position shown in Fig. 10, it does disengage the gear 42. The handle 62 operates a screw extending into a bracket 64 on the gear casing 40 and collared in a bracket 66 upon the upper gear casing 50. The handle, therefore, when rotated, will slide the casing 50 upon the slideway 46, 48 and move it horizontally relatively to the gear casing 40. The gears 42 and 52 as shown in Fig. 10 are not in engagement, power being transmitted from the gear 42 to the gear 52 by the pinion 58. When the casing 50 and gear 52 are slid to the right in Fig. 10 and the pinion 58 is slid to the left, the gear 42 drives the gear 52 directly. It is obvious that in the first case the large gears will rotate in the same direction and that in the second case they will rotate in the opposite direction. The spindle 56 is held in one position or the other by the locking pin 68. The gear 42 carries lugs 70 to which is removably bolted a shaft 72 having a flange 74 and a threaded portion 76.

The propeller blank 78 will preferably have its hub portion bored in the manner desired in the finished propeller. The plate 74 carries lugs 80 so arranged as to fit into the holes 82 in the propeller hub and so as to hold it in position upon the flange 74. The shaft 72 is made to fit the central hole in the propeller and the nut 84 will clamp the blank fast upon the shaft 72. The shaft 72 has a screw joint at 85, which permits the removal of the propeller engaging stem from the flange 74, to facilitate the mounting and dismounting of the propeller blank. The ends of the propeller blank are grasped between the dogs 24. The model propeller 86 which will be preferably formed of metal is mounted upon a frame 88 forced to engage its hub centrally by means of lugs 90 and the frame 88 is bolted within the upper gear 52. The model ends are provided with stubs 92 and the stubs are grasped between the dogs on the spindles 26. It is obvious that when the large gears rotate in the same direction, a right propeller will be cut from a right model and when the gears rotated in opposite directions a left propeller will be cut from a right model. The lower large gear is rotated by a gear 94 driven by a gear 96 on a shaft 98 which, in its turn, is driven by a gear 100 on a shaft 102 which is directly connected to a motor 104 through a suitable clutch 106.

The main bed of the machine 10 carries in its top surface guides 108 and 110 upon which slide two carriages 112 which carry the model wheels and cutters. These carriages are reflections of each other and a description of one will suffice.

Figure 1:
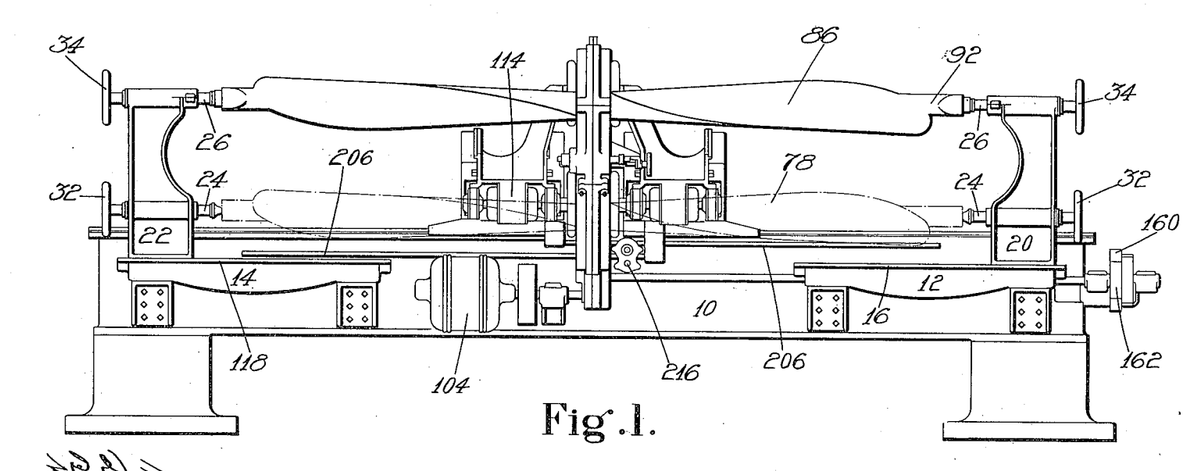
Fig. 1 is a front elevation of the machine.
Figure 2:
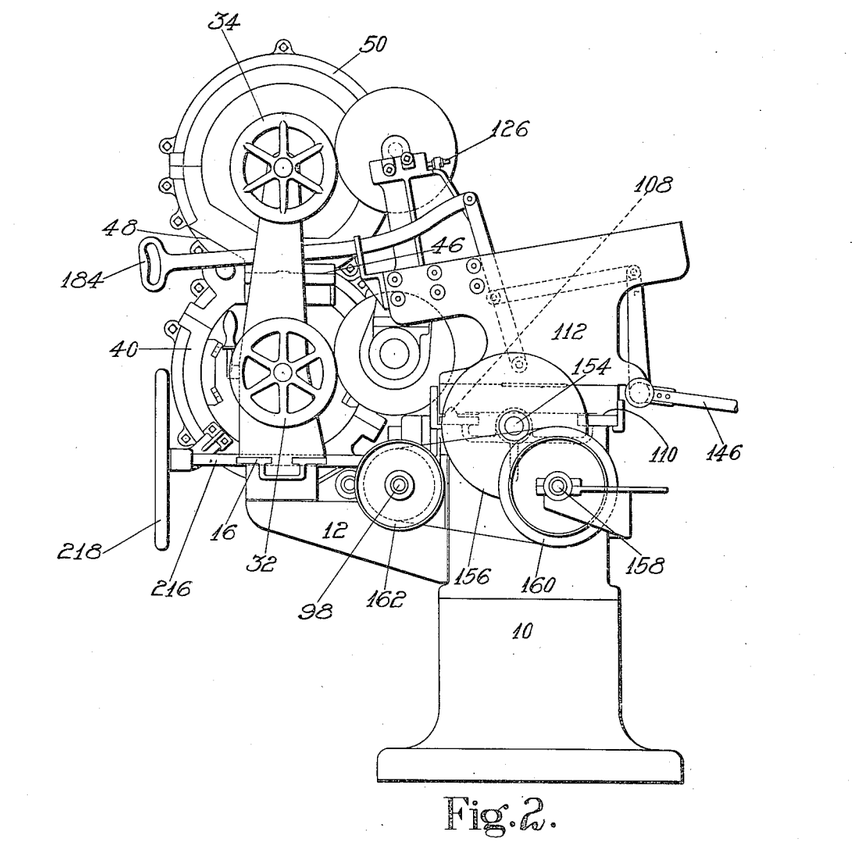
Fig. 2 is an end elevation of the machine.
Figure 3:
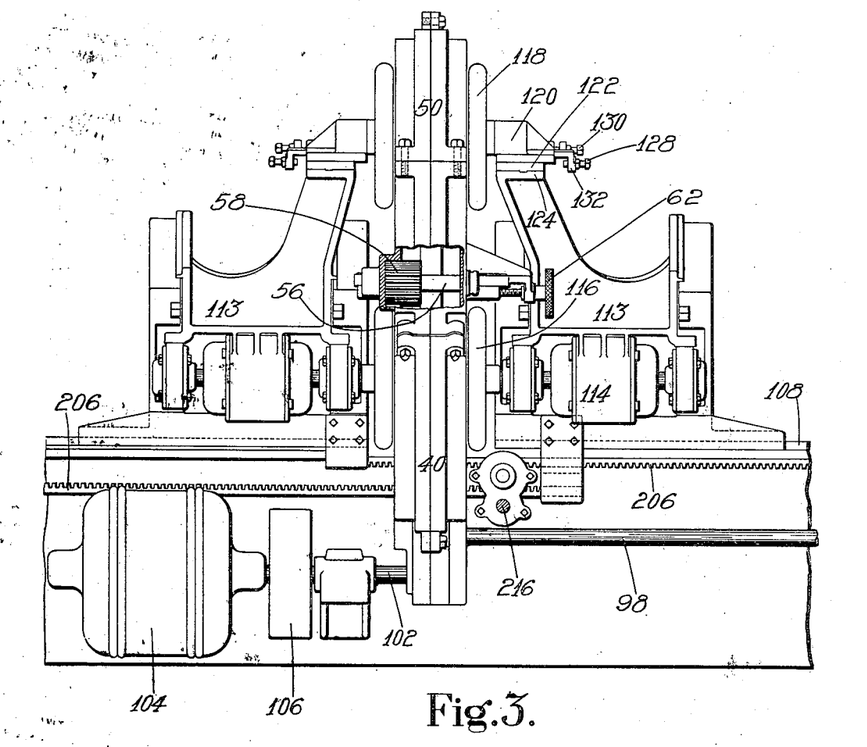
Fig. 3 is an enlarged front elevation of the operating mechanism partly broken away.

Each carriage 112 has slidably mounted upon it a carriage 113 in a manner which will be described below. The carriage 113 carries the cutter head and model wheel. The carriage 113 carries a motor 114 the shaft of which is directly connected to the cutter head diagrammatically shown at 116. Directly above the cutters 116 are the model wheels 118 of the same shape as the effective surface of the cutter head. The model wheel 118 is mounted upon the bracket 120 which is slidable in the direction of the axis of the wheel upon a plate 122, the plate 122 being slidable at right angles with this direction upon the cap 124 mounted at the upper surface of the carriage 112. The position of the plate 122 is regulated by an adjusting screw 126 and the position of the bracket 120 is regulated by two screws 128 and 130, the former of which is mounted in a bracket 132 extending from the bracket 120 and engages the plate 122 and the latter of which is mounted on a bracket 134 extending from the plate 122 and engages the bracket 120. Setting both screws will clamp the bracket 120 firmly upon the plate 122. Bolts 136 will then clamp the structure firmly together. The model wheels will be moved from side to side as shown in Fig. 3 when the large gears 42 and 52 are shifted in order that the relative positions of the model wheels and the upper gear casing 50 may remain always the same.

The carriage 113 has a base 138 which has on each side a rib 140. The carriage 112 has two sets of ball bearings 142 and 144 which engage the rib on its upper and lower surfaces and upon its side respectively, thus forming a slideway for the rib and the base 138. This slideway as shown is built on an angle with the horizontal in order that the force of gravity may be utilized in pulling the model wheel and cutter down to their work, thereby avoiding moving as much mass in the form of a counterweight as would otherwise be necessary. This counterweight resistance, if necessary, may be applied to an arm 146 and will be transmitted through the rockshaft 148, arm 150 and link 152 to the base 138. This counterweight may be arranged to act in either direction as desired, either to force the carriage down the slope or to lift it up.

Figure 4:
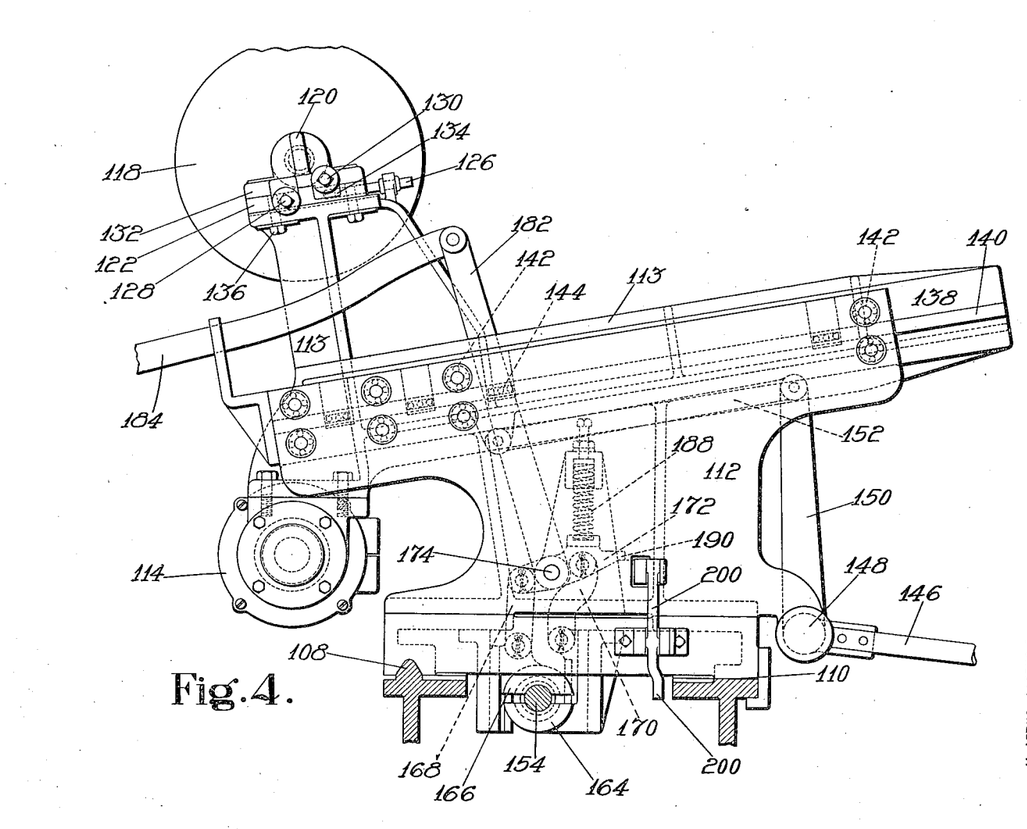
Fig. 4 is a side elevation of the model wheel and cutter mechanism.
Figure 5:
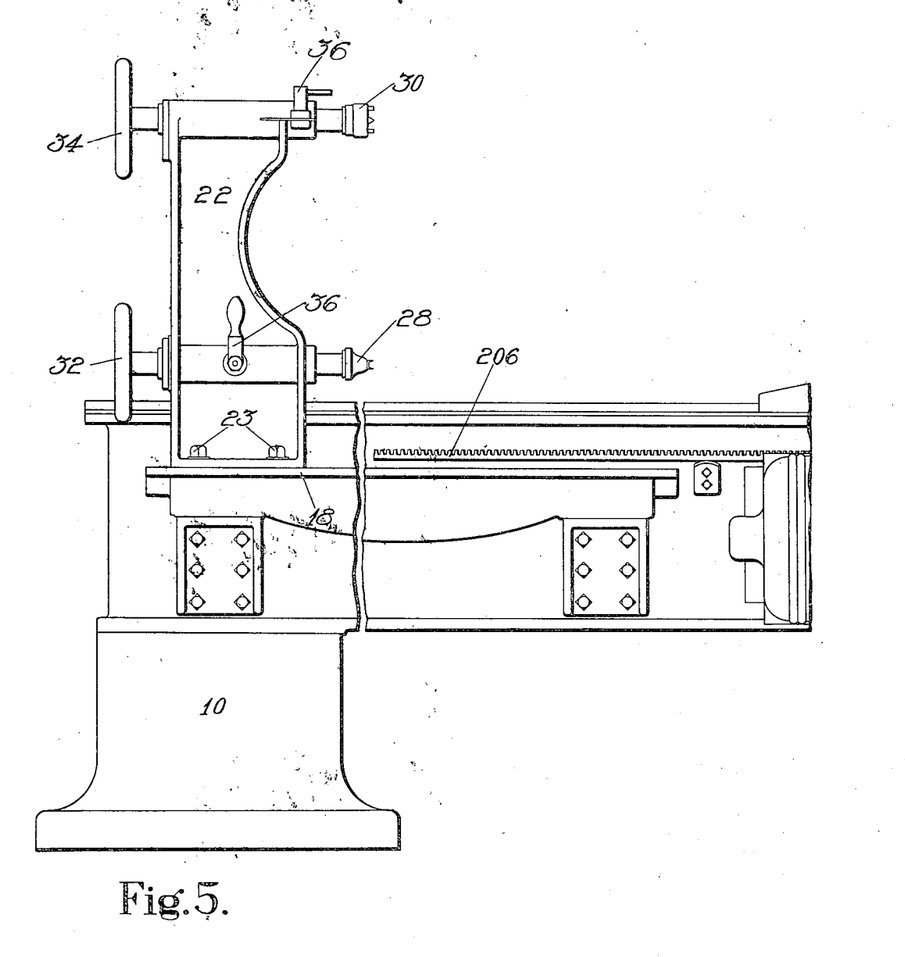
Fig. 5 is a front elevation of one end of the machine.
Figure 6:
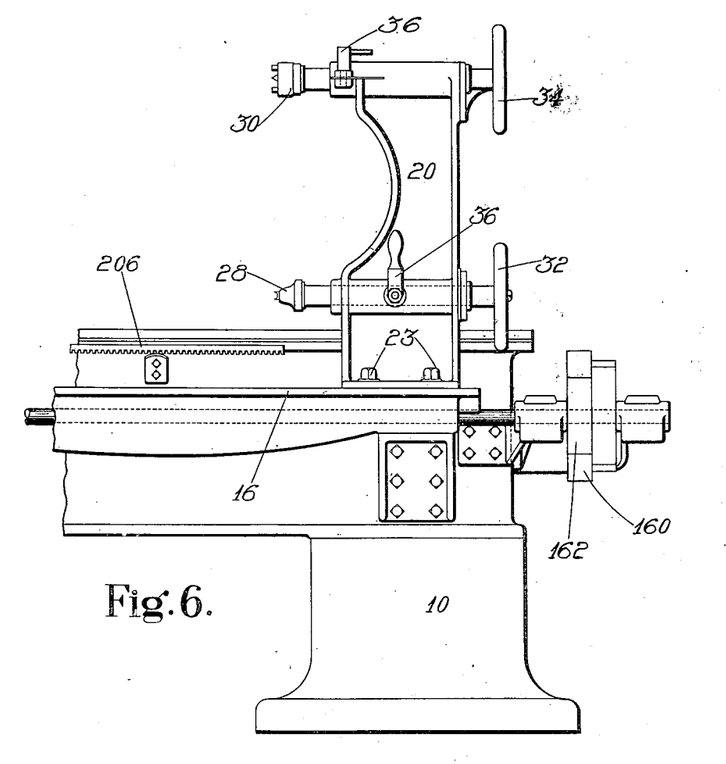
Fig. 6 is an elevation of the other end of the machine.
Figure 7:
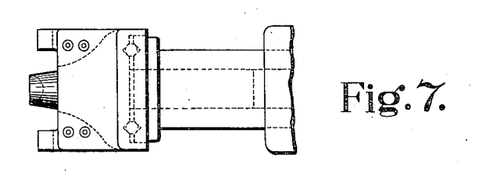
Fig. 7 is a detail of the dog.
Figures 11, 12:
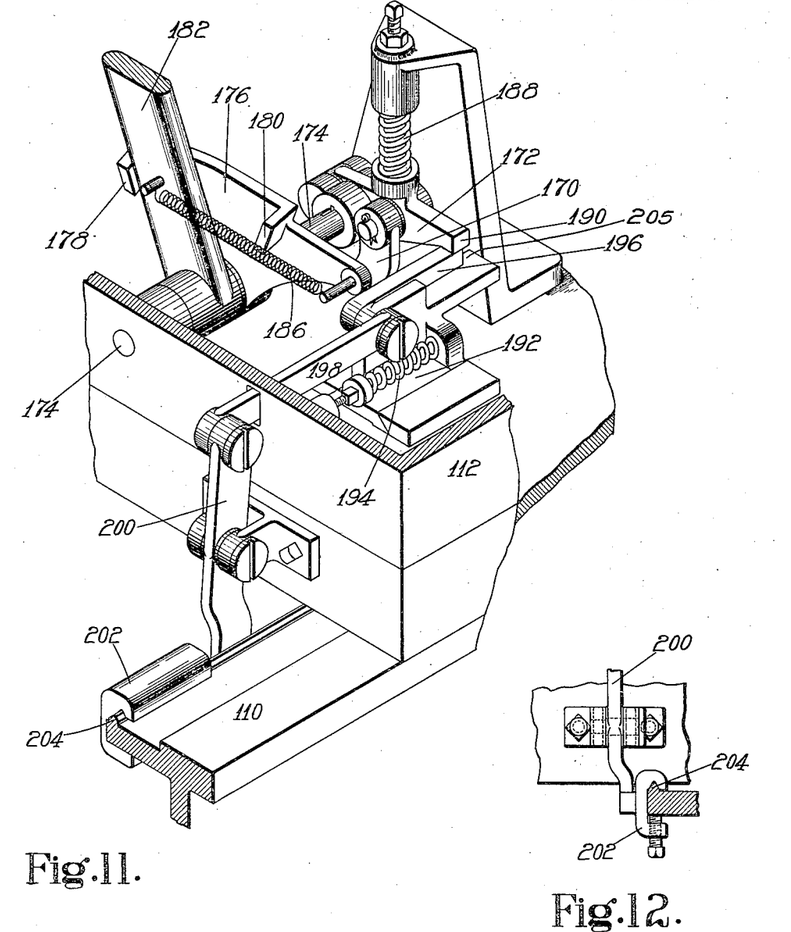
Fig. 11 is a detail of the automatic power disconnecting mechanism.
Fig. 12 is a detail of a stop.

The carriages 112 are driven by a screw 154 upon which is mounted a gear 156 driven by a gear upon the shaft 158 upon which is mounted the cone pulley 160 bolted to the cone pulley 162 upon the shaft 98. This screw 154 is grasped between the two halves of a split nut 164 and 166. These two halves are vertically slidably mounted upon each other and upon the carriage 112 and are moved toward and from each other by two links 168 and 170 mounted on the ends of the lever 172 which is mounted on the rockshaft 174. This rockshaft has mounted upon it an arm 176 having two lugs 178 and 180 which can be engaged by a lever 182 which is freely pivoted on the rockshaft 174. The lever is pulled forward by the handle 184 and is normally held in contact with the lug 180 by the spring 186. The spring 188 normally tends to throw the lever 172 clockwise in Fig. 4 and unlock the split nut. The lever 172 has a nose 190 extending over the path of movement of a carriage 192 which slides upon the carriage 112 as shown in Fig. 11 and is normally maintained in an extreme position by the compression spring 194. This carriage has a lug 196 upon it extending to a position short of its end, and normally being under the nose 190 to hold the lever 172 in the position shown in Fig. 11, with the split nut engaged, and is connected by a link 198 to a lever 200 which extends downwardly near the slide 110. A clamp 202 can be adjustably positioned on a rib 204 in the path of the lower end of the lever 200.

Assuming that the split nut is engaged with the screw and the carriage 112 in motion, it will move until the lever 200 strikes the stop 202 whereupon the carriage 192 will be withdrawn, the lug 196 will slide out from under the nose 190 with which it is normally engaged, the nose 190 will fall to the shelf 205 on the carriage 192, and the lever 172 will be forced around by the spring 188, unclamping the split nut and releasing the carriages 112 from the drive. When the carriages have been moved back to initial position, the lug 196 will slide up against the side of the nose 190 and when the handle 184 is pulled to lock the nut again, the lug 196 slides under the nose 190, thus locking the split nut.

The object of the free play of the lever 182 between the lugs 180 and 178 is to enable the split nut to be unclamped more readily. The lever 182 will be normally in contact with the lug 180 and the spring 188 will therefore not have to set it in motion and swing it when the arm 196 is withdrawn from the nose 190. When the handle 184 is pulled forward the lever 182 first moves idly until it strikes the lug 178 and then it turns the arm 176.

Each carriage 112 carries a rack bar 206 both of which are engaged by a pinion 208 on a shaft 210 on which is mounted a pinion 212 engaged by pinion 214 on a shaft 216 operated by a handle 218. This mechanism enables the operator to move the carriages rapidly from one position to another, when the split nuts are disengaged, and keeps them always in proper relative position, so that the nuts will engage simultaneously and properly.

A proper adjustment of the screw 126 will cause the cutter to be relatively advanced or retracted with regard to the model wheel so that a thinner or thicker propeller blade can be cut from the same model. The effect of changing the adjustment of the screw 126 will be to add or substract a skin of roughly constant thickness from the surface of the normal propeller blade.

The machine described insures the turning of accurately formed propellers. The turning will preferably be done from the middle toward the ends, so that the thickest part of the blades will be turned first. This circumstance, together with the feature of control and lateral support, enables the work to be produced without bending under the machine reactions, with consequent accuracy.

Having described my invention, what I claim as new and desire to secure by Letters Patent of the United States is:—

1. In a lathe for turning propellers, a gear for rotating the propeller blank, and a spindle for chucking the blank, comprising two sections, one having a flange and the other a nut, there being a screw joint between the sections, the flange having lugs arranged to fit the bolt holes in a prepared propeller hub and the nut being arranged to clamp the hub against the flange, and means for detachably bolting the spindle to the gear.

2. In a machine of the class described, a gear arranged to encircle and chuck the work, a second gear arranged to encircle and chuck the model, casings for the gears having sliding engagement to carry the gears into or out of mesh, an intermediate pinion arranged for insertion between the gears when out of mesh and model wheel and cutter carriages arranged for similar sliding engagement to maintain unaltered the relative relations of model and model wheel, and work and cutter, in either position of the gears.

3. In a machine of the class described, a gear carrying and rotating the model, a second gear carrying and rotating the work, said gears normally meshing, but being laterally relatively movable to insert an intermediate gear, a carriage arranged to move parallel to the axis of the gears and carrying a cutter, and a second carriage carrying a model wheel mounted on the cutter carriage, said carriages being arranged for relative lateral adjustment to maintain the relation between the model wheel and the model operating gear when the intermediate gear is engaged.

In testimony whereof I have signed my name to this specification.

LELAND B. WHIPPLE.

Certificate of Correction.

It is hereby certified that in Letters Patent No. 1,425,563, granted August 15, 1922, upon the application of Leland B. Whipple, of Rochester, New York, for an improvement in "Propeller Lathes," errors appear in the printed specification requiring correction as follows: Page 2, line 43, for the word "forced" read *formed*, and line 51, for the word "rotated" read *rotate;* page 3, line 52, after the word "from" insert the word *under;* and that the said Letters Patent should be read with these corrections therein that the same may conform to the record of the case in the Patent Office.

Signed and sealed this 14th day of November, A. D., 1922.

[SEAL.]

KARL FENNING,
*Acting Commissioner of Patents.*